(12) United States Patent
Valkenburg

(10) Patent No.: US 6,318,753 B1
(45) Date of Patent: Nov. 20, 2001

(54) SAFETY DEVICE

(75) Inventor: Jan-Huibert Valkenburg, Congloton (GB)

(73) Assignee: Autoliv Development AB, Vårgårda (SE)

( * ) Notice: Subject to any disclaimer, the term of this patent is extended or adjusted under 35 U.S.C. 154(b) by 0 days.

(21) Appl. No.: 09/242,684

(22) PCT Filed: Aug. 20, 1997

(86) PCT No.: PCT/SE97/01405

§ 371 Date: Jun. 21, 1999

§ 102(e) Date: Jun. 21, 1999

(87) PCT Pub. No.: WO98/07598

PCT Pub. Date: Feb. 26, 1998

(30) Foreign Application Priority Data

Aug. 20, 1996 (GB) .................................................. 9617419

(51) Int. Cl.$^7$ .................................................. B60R 21/22
(52) U.S. Cl. ................................. 280/730.2; 280/743.2
(58) Field of Search .......................... 280/730.2, 729, 280/749, 732, 743.2

(56) References Cited

U.S. PATENT DOCUMENTS

| | | | |
|---|---|---|---|
| 3,801,126 | * 4/1974 | Knight, IV et al. | 280/732 |
| 5,333,898 | 8/1994 | Stutz . | |
| 5,358,273 | 10/1994 | Onishi et al. . | |
| 5,464,250 | 11/1995 | Sato . | |
| 5,566,977 | * 10/1996 | Wipasuramonton | 280/743.1 |
| 5,730,464 | * 3/1998 | Hill | 280/743.2 |
| 5,788,270 | * 8/1998 | Haland et al. | 280/729 |
| 5,797,621 | * 8/1998 | Ono | 280/730.2 |
| 5,884,937 | * 8/1998 | Yamada | 280/730.2 |
| 6,000,715 | * 12/1999 | Tschaeschke | 280/730.2 |
| 6,032,977 | * 3/2000 | Reh et al. | 280/729 |

FOREIGN PATENT DOCUMENTS

| | | |
|---|---|---|
| 41 34 995 | 3/1993 | (DE) . |
| 43 29 275 | 3/1995 | (DE) . |
| 44 26 848 | 2/1996 | (DE) . |
| 29605896 | * 7/1996 | (DE) . |
| 196 47 679 | 6/1997 | (DE) . |
| 0 687 596 | 2/1990 | (EP) . |
| 0 701 930 | 3/1996 | (EP) . |
| 2 252 083 | 7/1992 | (GB) . |
| 2 261 636 | 5/1993 | (GB) . |
| 2 277 719 | 11/1994 | (GB) . |
| 2 297 950 | 8/1996 | (GB) . |
| 09/09295 | 8/1990 | (WO) . |
| 94/19215 | 9/1994 | (WO) . |
| 96/26087 | 8/1996 | (WO) . |

* cited by examiner

*Primary Examiner*—Kenneth R. Rice
*Assistant Examiner*—Lynda Jasmin
(74) *Attorney, Agent, or Firm*—Venable; Robert Kinberg; John P. Shannon

(57) ABSTRACT

A safety device in a motor vehicle, the device comprising an inflatable element adapted to be disposed between an occupant of the vehicle and the side of the vehicle when inflated to afford protection in the event of a side impact or a roll-over, means for inflating the inflatable element and means for sensing a side impact or a roll-over and for activating the inflating means, the inflatable element being formed from two layers of fabric which define a front part and a rear part of the inflatable element, selected regions of the two layers of fabric being interconnected by means of straps disposed internally within the inflatable element, the inflatable element having an edge portion secured to part of the door frame of the vehicle, the said part of the door frame being non-linear.

6 Claims, 5 Drawing Sheets

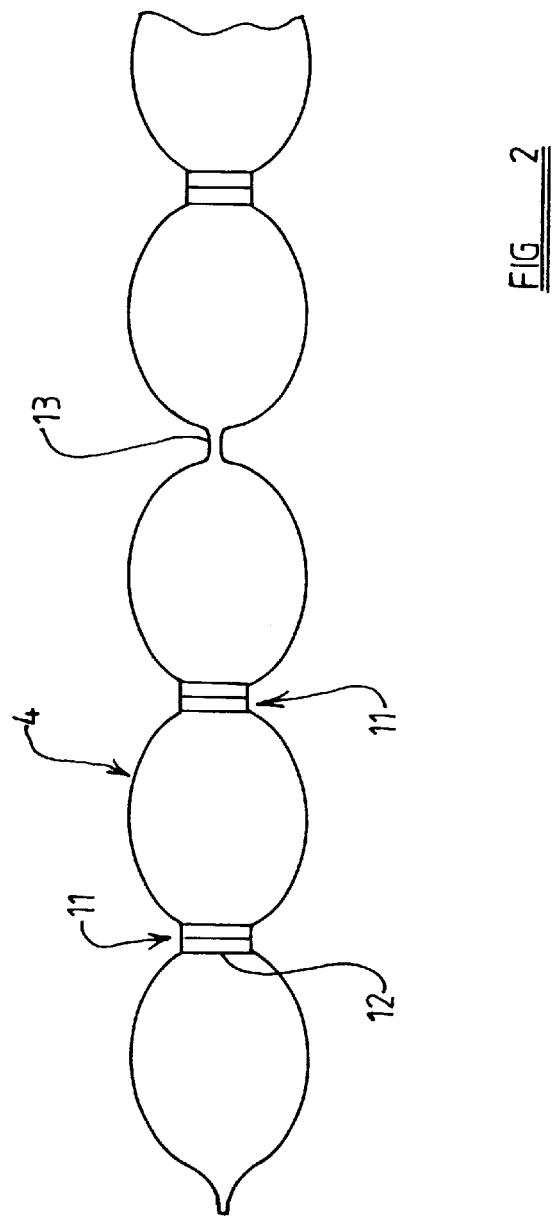

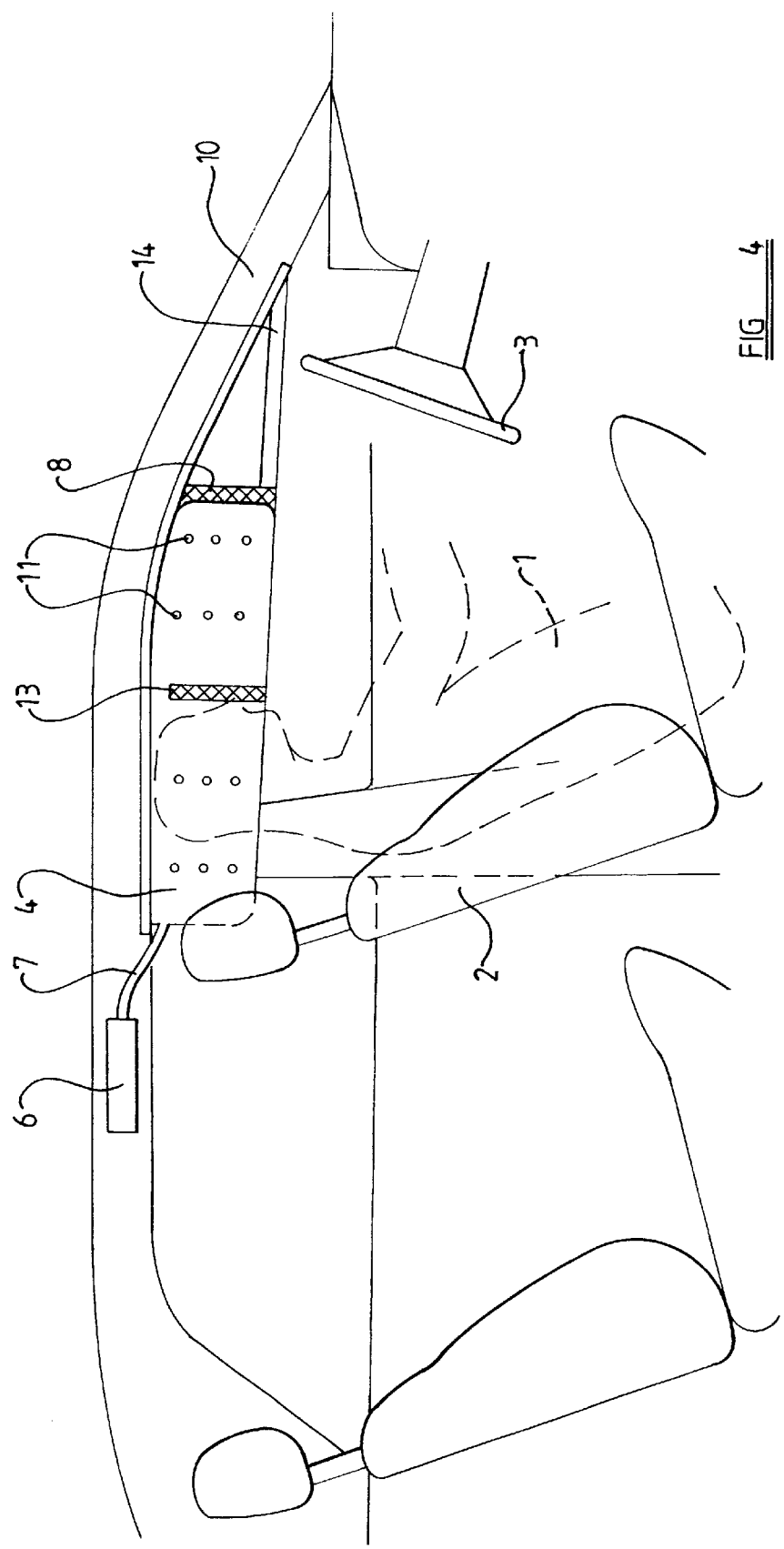

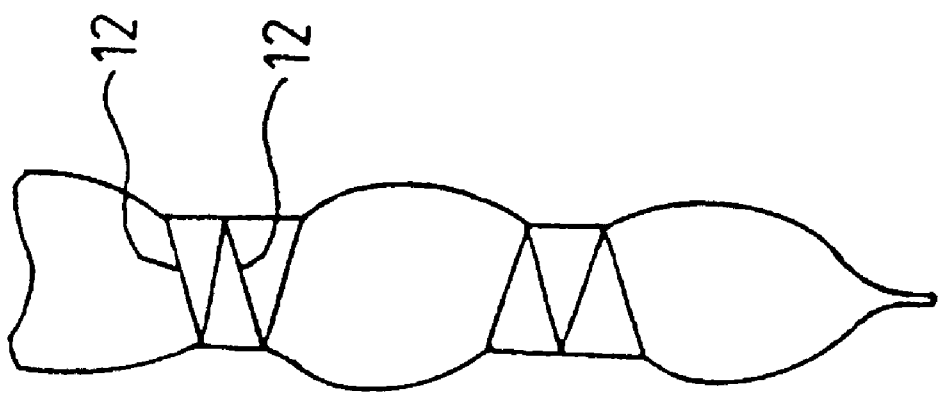

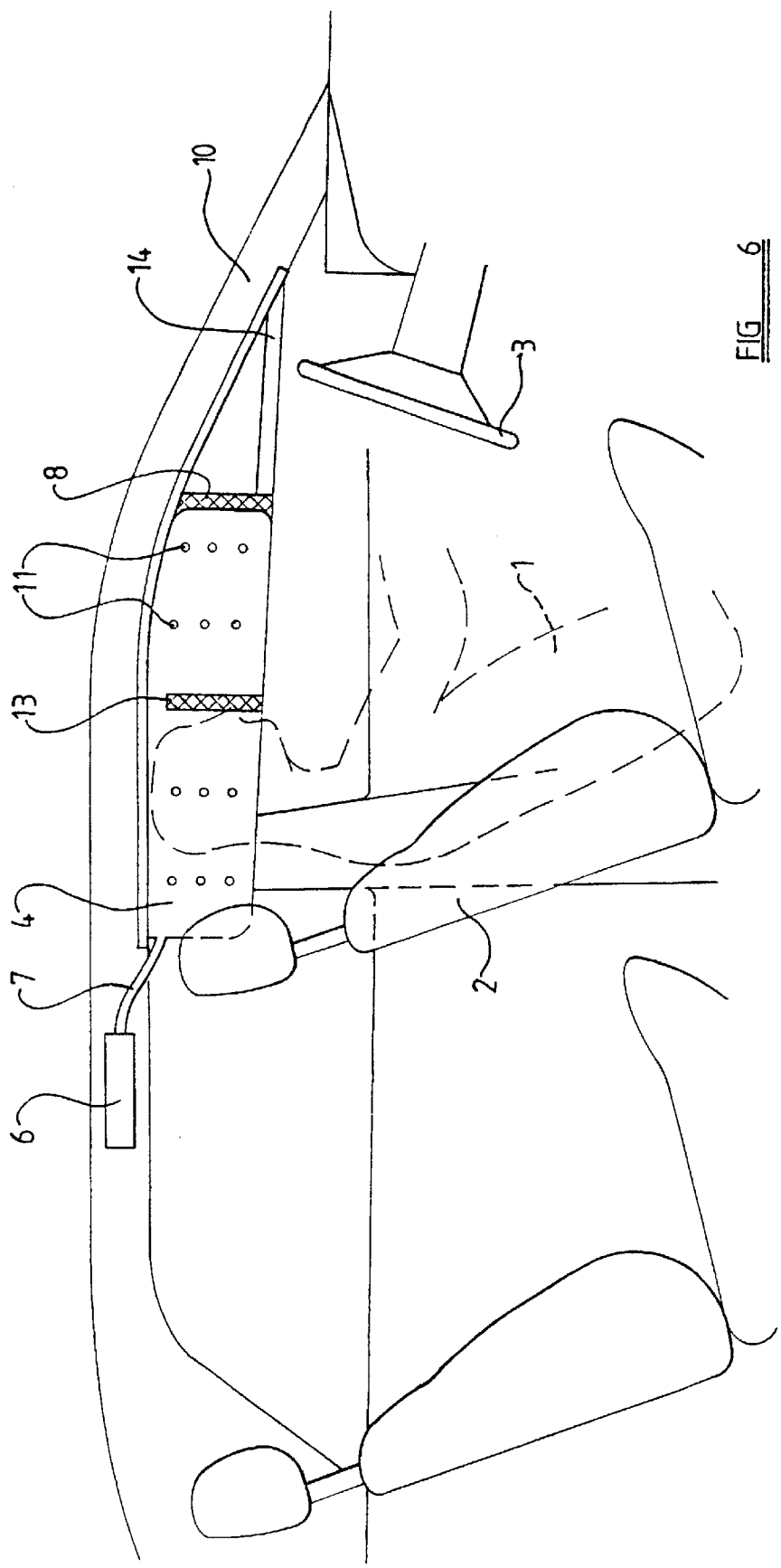

SAFETY DEVICE

THE PRESENT INVENTION relates to a safety device, and more particularly a safety device in the form of an inflatable element provided in a motor vehicle such as a motor car in order to afford protection for the occupants of the vehicle in the event of a side impact or roll-over.

It has previously been proposed to provide an inflatable element or air bag in a motor vehicle in a position such that in the event of an accident involving a side impact the inflated element is disposed between the side of the vehicle and the head of a vehicle occupant in order to protect against the occupant's head coming into contact with or passing through a window in the side of the vehicle.

It has been proposed to divide the inflatable element into a plurality of interconnected "cells" by forming the element from two woven layers of fabric with selected regions of the two fabric layers being woven together in order to interconnect the two layers and thereby define the periphery of each of the cells. The interwoven regions which define the periphery of each of the cells may be relatively large thereby reducing the overall volume of the inflatable cells and the volume of gas which is required to inflate the element such that the element may be inflated more quickly. Dividing these inflatable elements into a plurality of cells prevents the element from "ballooning" when inflated, thereby enabling the inflated shape of the element to be controlled.

However, dividing the inflatable element into a plurality of cells by weaving together the two layers of fabric which form the element in selected regions also has certain disadvantages. It is not as easy to control the inflation of a large number of small cells as it is to control the inflation of one or two larger chambers. Thus, whilst the volume of gas required to inflate the element may be reduced, the regions where the two layers of fabric are woven together present "obstructions" to the natural flow of gas into the inflatable element during inflation and these interwoven regions may therefore "impede" the flow of gas and result in the element inflating in a manner which is not exactly as desired.

The present invention seeks to provide an improved safety device of the type described above.

The present invention provides a safety device in a motor vehicle, the device comprising an inflatable element adapted to be disposed between an occupant of the vehicle and the side of the vehicle when inflated to afford protection in the event of a side impact or a roll-over, means for inflating the inflatable element and means for sensing a side impact or a roll-over and for activating the inflating means, the inflatable element being formed from two layers of fabric which define a front part and a rear part of the inflatable element, wherein the inflatable element is formed with a seam or region where the two layers of fabric forming the inflatable element are secured together such that the inflatable element comprises two inter-connected chambers selected regions of the two layers of fabric being interconnected by means of straps disposed internally within the inflatable element, the inflatable element having an edge portion secured to part of the door frame of the vehicle, the said part of the door frame being non-linear.

The regions of the two layers of fabric which are interconnected by the straps may comprise a plurality of "spots" or relatively small regions, which may be arranged in lines. Alternatively the regions may comprise lines or relatively large elongate regions.

Preferably the straps are formed from a material which does not shrink or which shrinks to a lesser degree than the material from which the inflatable element is formed. The straps may be formed of an aramid fibre, such as Kevlar.

Conveniently the inflatable element is formed with a seam or region where the two layers of material forming the inflatable element are secured together such that the inflatable element comprises two interconnected chambers.

Advantageously the inflatable element comprises a forward chamber and a rear chamber, the rear chamber being connected to the means for inflating the inflatable element and being disposed adjacent the B-post of the vehicle chassis when inflated.

The edge portion of the inflatable element which is secured to part of the door frame of the vehicle may be secured directly thereto. Alternatively it may be secured thereto over at least part of its entire length via an intermediate web or sheet.

In order that the present invention may be more readily understood and so that further features thereof may be appreciated the invention will now be described by way of example with reference to the accompanying drawings in which:

FIG. 2 is a view corresponding to FIG. 1 but illustrating a modified embodiment of the safety device;

FIG. 3 is a further view corresponding to FIG. 1 illustrating a further modified embodiment of the safety device; and FIG. 4 is a sectional view along line 4—4 of the safety device as shown in FIG. 3;

FIG. 5 is a sectional view of the safety device as shown in FIG. 3, along line 5—5; and FIG. 6 is another view corresponding to FIG. 1 showing yet a further modified arrangement.

Figure 1:
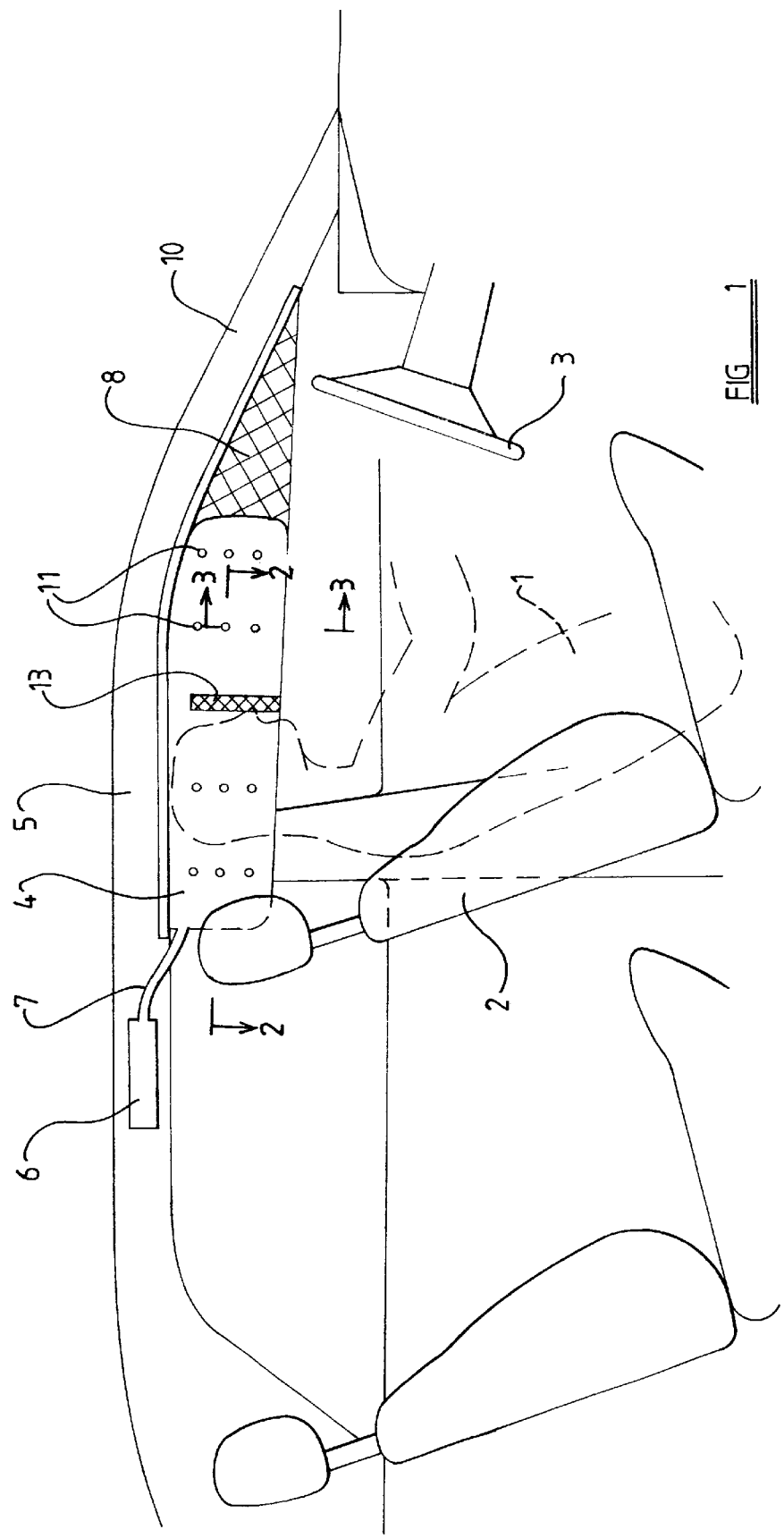
FIG. 1 is a side view of part of the interior of a motor vehicle illustrating a safety device in accordance with the present invention when in an operative condition.

Referring initially to FIG. 1 a safety device is illustrated which is intended to provide protection for a person 1 sitting in a seat 2 in a motor vehicle. In any (frontal) accident in which the vehicle is rapidly decelerated the person will tend to move forwardly towards the steering wheel 3, but will be restrained by a conventional seat belt or air bag. In the case of a side impact or roll-over, there is a risk that the head of a person 1 will strike the side of the vehicle and in particular a window which may be provided in the side door or that the head of the person will strike the B-post. There is also a risk that if, as commonly occurs, the glass of a window in the door adjacent to the person 1 breaks, the head of the person may be thrown out of the window especially in the case of a roll-over.

The safety device is shown in an operative condition in FIG. 1 in which an inflatable element 4 is positioned between the head of the person 1 and the side of the vehicle. When the safety device is not in use it is retained in a recess provided in the door frame 5 of the motor vehicle. The recess extends over a non-linear portion of the door frame so that the opposite ends of the recess are not in the same horizontal plane.

The safety device comprises the inflatable element 4, a gas generator 6 which is connected to the inflatable element 4 by means of a hose or duct 7 and a sensor (not illustrated) which senses a side impact and/or a roll-over situation and which serves to activate the gas generator at an appropriate instant. The gas generator 6 may be located in the door frame 5 or upon the B-post of the vehicle chassis. The inflatable element 4 is formed from two layers of fabric which are interwoven at predetermined regions so as to form the periphery of the bag or enclosure constituting the inflatable element. Thus, the inflatable element may be regarded as having a front part and a back part each formed from a woven layer of fabric. A technique for making an inflatable element of interwoven fabric is described in more detail in International Patent Publication WO90/09295.

It will be appreciated that the upper edge of the inflatable element 4 is fixed to part of the door frame 5 and the inflatable element extends, when in the inflated condition as shown in FIG. 1, downwardly from the door frame to be positioned between the head of the person 1 and the side of the vehicle. The inflatable element 4 is relatively thin in the lateral direction, that is to say in a direction extending into the plane of the drawing of FIG. 1 and may have a thickness of approximately 30 to 40 mm in that direction.

The safety device further comprises a web or sheet 8 which extends forwards from the front edge of the inflatable element 4 to be connected also to the door frame 5 in the region above the vehicle door and in the region of the A-post of the vehicle chassis. The front edge 9 of the inflatable element 4 does not extend vertically downwardly from the door frame 5 but extends downwardly and forwardly as is clearly illustrated in FIG. 1.

It will be appreciated that the upper edge of the safety device, as constituted by the upper edge of the inflatable element 4 and the upper edge of the web or sheet 8 is fixed to the door frame 5 over a length of the door frame which is non-linear. Thus the safety device extends from fixed points at opposite ends of the recess in the door frame with those fixed points being disposed on a non-linear part of the door frame. The upper edge of the safety device therefore has a non-linear configuration which conforms with the non-linear configuration of the upper part of the door frame 5 and the safety device is fixed to and supported on a non-linear part of the door frame. Since the web or sheet 8 connects the edge 9 of the inflatable element to the door frame it will be understood that the entire upper edge of the inflatable element 4 may be regarded as being fixed to the upper part of the door frame over a region of the door frame which is non-linear.

The lower edge of the safety device extends substantially horizontally, both the lower edge of the inflatable element 4 and the lower edge of the web or sheet 8 being aligned and linear. The safety device extends rearwardly from the A-post 10 of the vehicle chassis to a position slightly to the rear of the B-post of the vehicle chassis so that, when in use, the safety device not only affords protection against the head of the person 1 striking a window in the side of the vehicle but also against the head of the person 1 striking the B-post of the vehicle chassis.

In order to prevent the inflatable element 4 from ballooning the two layers of fabric which form the opposed sides of the element 4 are interconnected at selected positions 11 by way of straps 12 (see FIG. 4) which extend between the opposed layers of fabric. The straps 12 are formed from a material which does not shrink or which will shrink to a lesser degree than the fabric material from which the inflatable element 4 is formed. Whilst the straps 12 interconnect the opposed layers of material forming the inflatable element they do not serve to join the two layers together or to "partition" individual cells within the inflatable element. In contrast the straps 12 allow the inflatable element to retain an open internal structure whilst still preventing ballooning by defining regions which may be regarded as individual cells. The straps may be formed of aramid fibres such as Kevlar which has a higher heat resistance and lower shrinkage than the material used in the inflatable element. The straps may be woven or sewn into the layers of fabric forming the inflatable element. In any event the straps 12 permanently interconnect the opposed layers of fabric in selected regions.

In an accident situation, such as a side impact, the gas generator 6 is activated and gas from the generator inflates the inflatable element 4 which moves from its initial, stored position within the recess in the door frame 5 to the inflated or operative condition shown in FIG. 1. The "open" internal structure of the inflatable element 4 provided by the straps 12 permits gas to flow rapidly and easily into all regions of the inflatable element. In this operative condition the inflatable element 4 extends downwardly from the top of the door frame 5 to form a generally flat structure between the head of the person 1 and the side of the vehicle.

It will be appreciated that the entire upper edge of the inflatable element 4 is fixed to a non-linear part of the door frame, either by virtue of the upper edge being fixed directly to the door frame or being fixed to the door frame via the web or sheet 8.

In an accident situation the inflatable element is moved from the deflated or stored position to the fully inflated condition within about 15 ms. The inflatable element 4 is purposely not provided with a vent hole to vent gas from within the element to the atmosphere so that the element will remain inflated for a relatively long period of time in order to provide protection in the case of a protracted roll-over accident. The fact that, internally, the inflatable element is of a generally open structure with the straps 12 not serving to partition off individual cells, means that if the head of the person 1 impacts the inflated element the pressure of gas within the whole element or at least a substantial part of the element will rise thus giving a "soft" impact.

The weight of the fabric used to form the inflatable element should be kept as low as possible so that if, upon inflation, the fabric strikes the head of the person 1 no serious injury will be sustained. It is envisaged that a fabric having a weight of less than 300 grams per square metre and preferably approximately 175 grams per square metre may be used.

In order to retain the inflated safety device securely in the position illustrated in FIG. 1 tensioning means may be provided to tension and retain it in place. Thus, for example, the upper edge of the web or sheet 8 may be connected at its forward most end to a cable which extends to a tensioning device. Similarly the rearmost region of the inflatable element 4 may carry, adjacent its lower edge a cable or strap which extends to a tensioning device or fixing element mounted in the door frame to the rear of the gas generator 6. One or both of these means may serve to tension the lower edge of the safety device thereby stretching and holding it securely in place once it is inflated.

In the embodiment shown in FIG. 1 of the drawings the straps 12 which serve to interconnect the two layers of fabric forming the inflatable element 4 are positioned at selected "spots" identified by the reference numerals 11, those spots or regions being formed in generally vertically extending lines. In an alternative embodiment illustrated in FIG. 2 of the drawings the straps 12 may be provided in vertical lines extending down in the regions identified by reference numerals 11 over almost the full depth of the inflatable element 4. Other arrangements are, of course possible such as an arrangement in which the straps 12 do not extend horizontally but extend at an angle to the horizontal to form a zig-zag arrangement between the two layers of the fabric forming the interconnected regions 11 of the inflatable element 4 as shown in FIG. 5.

In the further modified arrangement of FIG. 3 the inflatable element 4 extends over a greater distance in a direction from front to rear of the vehicle and the front edge of the inflatable element extends substantially vertically. It is to be noted that, if desired, the web or sheet 8 could be omitted entirely with the inflatable element 4 extending forward so that its lower edge is fixed to the A-post region of the door frame at its forwardmost point. The safety device can cover the whole length of the front and rear door lines with inflatable elements 4 at selected areas.

The arrangement of FIG. 3 also differs from those of FIGS. 1 and 2 in that the inflatable element 4 is provided with a generally centrally located seam 13 which extends generally vertically up from the lowermost edge of the inflatable element to terminate at a short distance from the upper edge of the element. The seam 13 divides the inflatable element 4 into two interconnected chambers. The element 4 is otherwise provided with straps 12 in the same manner as the embodiment of FIG. 1. The seam 13 joins together the two layers of fabric which form the inflatable element and serves, during inflation of the element, to ensure that the rearmost portion which lies adjacent the B-post of the vehicle chassis is inflated first, thereby giving protection against the head of the person 1 coming into engagement with the B-post at the earliest possible moment in time.

FIG. 4 illustrates, in cross-section, the arrangement of the seam 13 which, rather than being a sewn seam could in fact be an interconnection between the two layers of fabric which is woven during production of the inflatable element 4.

It will be appreciated that various arrangements can be provided and the embodiments illustrated in the accompany drawings and described above are only a few examples. Thus the precise shape and configuration of the inflatable element 4 may vary as long as its upper edge is connected to a non-linear part of the door frame. Thus, for example, FIG. 6 illustrates yet a further modified arrangement of the design shown in FIG. 3 where the web of material 8 is only a thin, generally vertically extending web and a further strap or similar elongate element 14 extends from the lowermost edge of the web 8 forwards to connect with the A-post of the vehicle. In this arrangement an aperture or opening is left between the door frame 5, the web 8 and the strap 14. Such an arrangement may serve to reduce the overall weight of the arrangement by eliminating excess material. It would also enable the connection with the A-post to be formed by an element of a different material to that from which the web 8 is formed. Thus a material of greater strength could be used if necessary. In addition the precise manner in which the straps 12 are fixed within the inflatable element 4 may be varied.

What is claimed is:

1. A safety device in a motor vehicle, the device comprising:

an inflatable element adapted to be disposed above a door opening of the vehicle before inflation, and between an occupant of the vehicle and a side of the vehicle when inflated to afford protection in the event of a side impact, or a roll-over;

means for inflating the inflatable element; and means for sensing a side impact or a rollover, and for activating the inflating means, the inflatable element being formed from two layers of fabric which define a front part and a rear part of the inflatable element, the inflatable element having a seam in which the two layers of fabric which form the inflatable element are joined together, the seam dividing the inflatable element into two inter-connected chambers, selected regions of the two layers within the chambers being inter-connected, the inflatable element having an edge portion secured to a non-linear part of a door frame of the vehicle, wherein the vehicle has various fixed parts, one of said inter-connected chambers is adjacent to at least one said fixed parts, and said means for inflating comprises means for supplying gas to the one of said inter-connected chambers adjacent to said one fixed part.

2. A safety device according to claim 1, wherein the vehicle chassis has a B-post, and the inter-connected chambers comprise a forward chamber and a rear chamber, the rear chamber being connected to the means for inflating the inflatable element and being disposed adjacent the B-post of the vehicle chassis when inflated.

3. A safety device according to claim 1, wherein the edge portion of the inflatable element which is secured to the non-linear part of the door-frame of the vehicle is secured directly thereto.

4. A safety device according to claim 1, wherein the edge portion of the inflatable element which is secured to the non-linear part of the door-frame of the vehicle is secured over at least part of its length by a web.

5. A safety device according to claim 1, wherein the selected regions within at least one of the chambers are interconnected by connectors that enable the chamber to retain an open internal structure while preventing ballooning.

6. A safety device according to claim 1, wherein the vehicle chassis as an A-post, the safety device further comprising an elongate element extending forwardly from the inflatable element to connect the inflatable element to the A-post of the vehicle chassis.

* * * * *